Oct. 3, 1944. H. E. ROYS 2,359,585
PHONOGRAPHIC APPARATUS
Filed April 1, 1942
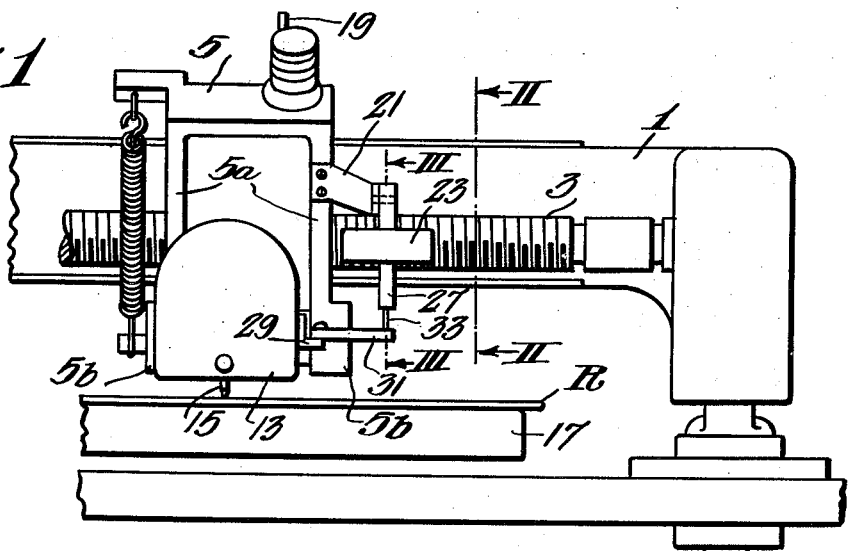
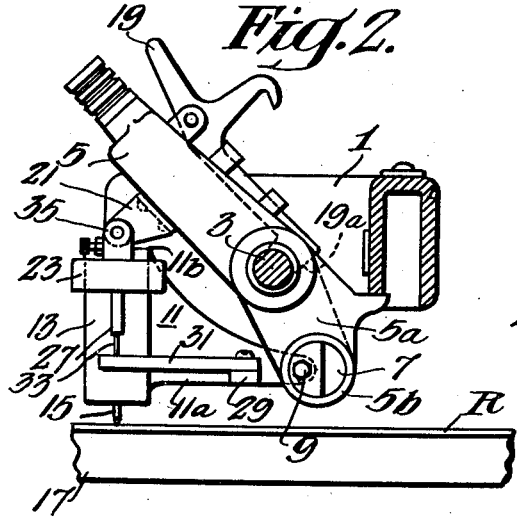
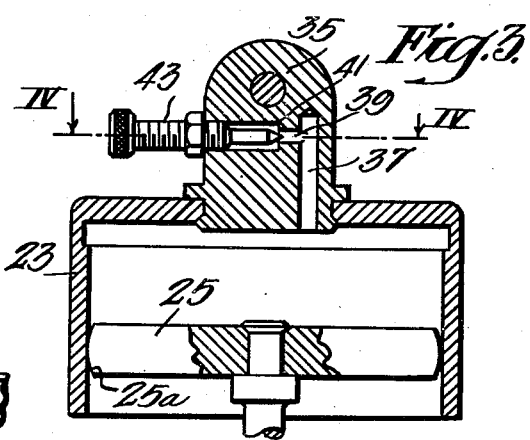
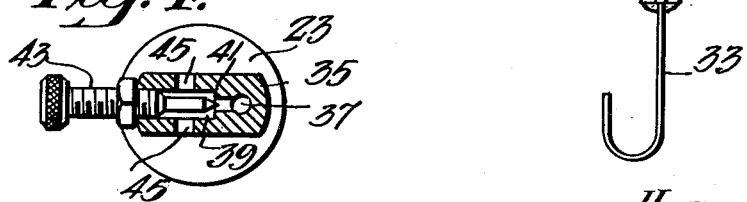
Inventor
Henry E. Roys
Attorney Patented Oct. 3, 1944

2,359,585

UNITED STATES PATENT OFFICE 2,359,585

PHONOGRAPHIC APPARATUS

Henry E. Roys, Indianapolis, Ind., assignor to Radio Corporation of America, a corporation of Delaware Application April 1, 1942, Serial No. 437,127

11 Claims. (Cl. 274—17)

This invention relates to phonographic apparatus, and more particularly to recording apparatus used in recording upon blank discs or cylinders which may be played back immediately after recording.

In recording apparatus of this type in which a cutter head or the like is employed having a needle which cuts a groove in the blank record, vertical vibrations or oscillations of the cutter head occur due to resonance of the mass of the cutter head and stiffness of the recording material. To eliminate, or at least greatly reduce, these oscillations, resort has been had to mechanical damping. Various forms of vibration inhibitors or damping devices have been employed for this purpose, among them being air dash-pots and viscous damping devices employing oil as the damping medium.

One disadvantage of the latter type of damping device is that the oil may leak or spill out. For this reason, it is often preferable to use an air dash-pot. However, due to the close fit required between the cylinder and the piston of an air dash-pot damping device, the friction between the piston and the cylinder wall which readily occurs as the cutter head swings through an arc about its pivot bearings in accommodating turntable wobble or variations in record thickness may become so great as to prevent proper operation of the dash-pot. For this reason, air dash-pot vibration dampers have not been altogether suitable.

The primary object of my present invention is to provide an improved form of vibration damper for phonograph cutters which will not be subject to the aforementioned and other similar disadvantages characteristic of prior art dampers.

More particularly, it is an object of my present invention to provide an improved air dash-pot damper for a recording head which is so constructed that swinging motion of the cutterhead relative to its supporting carriage will not cause excessive side friction between the piston and the cylinder wall of the dash-pot and which will not, therefore, impair its performance.

Another object of my present invention is to provide an improved vibration inhibitor as aforementioned which can be readily attached to existing recorders.

A further object of my present invention is to provide an improved vibration inhibitor as aforementioned which is simple in construction, inexpensive in cost, and highly efficient in use.

In accordance with my invention, I provide an air dash-pot vibration inhibitor comprising a cylinder connected to the carriage on which the cutter head is pivotally mounted and within which a piston operates. The piston is provided with the usual piston rod which is connected to the cutter head by a coupling member which is stiff in the direction of coupling but flexible laterally. As an example of a suitable coupling member of this type, music wire may be used. Preferably, also, the sides or longitudinal surfaces of the piston are crowned or formed on a curve. With this construction, suitable damping with minimum friction between the piston and the cylinder wall results. If the cutter head were rigidly attached to the piston rod, then, as the cutter head would oscillate about its pivotal mounting on the carriage, it would cause the piston to swing somewhat through an arc and thereby cause serious side friction between the piston and the cylinder. However, the flexible music wire yields laterally in response to the cutter head, and the piston is, therefore, free to move within the cylinder without excessive friction. The crowned surface of the piston also helps to avoid binding due to the rocking motion.

The novel features that I consider characteristic of my invention are set forth with particularity in the appended claims. The invention itself, however, both as to its organization and method of operation, as well as additional objects and advantages thereof, will best be understood from the following description of one embodiment thereof, when read in connection with the accompanying drawing, in which Figure 1 is a front elevation of a recorder embodying one form of my invention, Figure 2 is a sectional view taken on the line II—II of Fig. 1, Figure 3 is an enlarged sectional view taken on the line III—III of Fig. 1, and Figure 4 is a sectional view taken on the line IV—IV of Fig. 3.

Referring more particularly to the drawing, wherein similar reference characters designate corresponding parts throughout, there is shown a frame 1 which rotatably carries a feed screw 3 on which a carriage 5 is rotatably and slidably mounted. The carriage 5 is provided with a pair of downwardly extending arms 5a which terminate in a pair of aligned bearing members 5b on which is rotatably mounted a bearing 7. Eccentrically mounted on the bearing 7 are a pair of conically tipped screws 9 which pivotally carry a substantially U-shaped cradle 11 having parallel side arms 11a and a cross arm 11b to the latter of which is secured a signal translating device 13, such as a sound recording head provided with a needle or cutter 15 for cooperation with a record blank R rotatably supported on a turntable 17 in well-known manner. Pivotally mounted on the carriage 5 is a feed lever 19 which, at its lower end, is provided with a half nut 19a adapted to engage the feed screw 3 to provide driving engagement therebetween so that the assembly comprising the cutter head 13, its cradle 11, the carriage 5 and the lever 19 may be fed across the record blank R by the feed screw 3. The construction thus far described may be of the type disclosed and claimed in the Conrad patent, No. 2,254,839, granted September 2, 1941, and is not believed to require further detailed description.

Secured to the carriage 5 is a laterally and forwardly extending arm 21 to which is secured the hollow casing or cylinder 23 of an air dash-pot. A piston or plunger 25 is movably received in the cylinder 23 and has secured thereto a piston rod 27 in any suitable manner. Secured to one of the side arms 11a of the cradle 11 is a bracket 29 to which, in turn, is secured a forwardly and outwardly extending arm 31, and a thin, elongated piece of music wire or the like 33 couples the arm 31 to the piston rod 27, the wire coupling member 33 being secured to the arm 31 and the piston rod 27 in any suitable way.

The cylinder 23 is provided with a solid head 35 formed with a longitudinally extending bore 37 which communicates with the interior of the cylinder 23 and with a traverse bore 39 having a seat 41 against which the conical tip of a screw or valve 43 may seat to control the flow of air between the interior of the cylinder 23 and the atmosphere through a pair of openings 45 formed in the head 35 in communication with the bore 39. Also, the side or longitudinal surface 25a of the piston 25 is crowned or formed on a curve so that the piston will be free to rock within the cylinder 23 without binding. In the operation of my improved vibration inhibitor, as the cutter head or other signal translating device 13 rocks on the pivot screws 9 in response to turntable wobble, variations in record thickness, building rumble or other similar causes, it will cause the piston 25 to move up and down within the cylinder 23, this being assured by reason of the inherent stiffness of the wire coupling member 33 longitudinally thereof, or in the direction of coupling between the piston rod 27 and the arm 31. However, inasmuch as the coupling wire 33 is flexible in all directions laterally thereof, the wire 33 will bend slightly in response to the arcuate movement of the cutter head 13 whereby corresponding arcuate movement of the piston 25 will be avoided. Should the piston 25 tend to rock somewhat, it will be free to do so by reason of the crowned or curved longitudinal surface thereof. Hence, binding of the piston 25 within the cylinder 23 will be avoided and the friction between the piston 25 and the cylinder 23 will be a minimum.

From the foregoing description, it will be apparent to those skilled in the art that I have provided an improved variation inhibitor for phonographic apparatus which is not subject to the disadvantages of prior art devices of this sort. Although I have shown and described but one embodiment of my invention, it will undoubtedly also be apparent to those skilled in the art that many other embodiments thereof, as well as changes in and modifications of the one described, are possible. I, therefore, desire that my invention shall not be limited except insofar as is made necessary by the prior art and by the spirit of the appended claims.

I claim as my invention:

1. In phonographic apparatus, the combination of a carriage, a signal translating device pivotally mounted on said carriage and subject to slight mechanical vibrations relative to said carriage when cooperating with a record, and vibration inhibiting means for said translating device, said means comprising coacting elements in part on said carriage and in part on said translating device, said elements being relatively movable in substantially the same direction as the vibratory movement of said translating device relative to said carriage, and one of said elements including a coupling member which is stiff in said direction but flexible in a direction transverse thereto, said coupling member being arranged to extend longitudinally in said direction.

2. In phonographic apparatus, the combination of a carriage, a signal translating device pivotally mounted on said carriage and subject to slight mechanical vibrations relative to said carriage when cooperating with a record, and vibration inhibiting means for said translating device, said means comprising coacting elements in part on said carriage and in part on said translating device, and one of said elements including a relatively thin, elongated coupling member which is stiff in a longitudinal direction but flexible in a lateral direction, said coupling member being arranged to extend longitudinally in the direction of vibratory movement of said translating device relative to said carriage.

3. In phonographic apparatus, the combination of a carriage, a signal translating device pivotally mounted on said carriage and subject to slight mechanical vibrations relative to said carriage when cooperating with a record, and vibration inhibiting means for said translating device, said means comprising coacting elements in part on said carriage and in part on said translating device, and one of said elements including a relatively thin, elongated coupling member which is stiff in a longitudinal direction but flexible in all directions normal thereto, said coupling member being arranged to extend longitudinally in the direction of vibratory movement of said translating device relative to said carriage.

4. The invention set forth in claim 2 characterized in that said elongated member is constituted by a piece of music wire.

5. In phonographic apparatus, the combination of a carriage constituting a first part, a signal translating device pivotally mounted on said carriage and constituting a second part, said translating device being subject to slight mechanical vibrations relative to said carriage when cooperating with a record, and vibration inhibiting means for said translating device, said means comprising an air dash-pot including a cylinder carried by one of said parts, a piston within said cylinder, and means coupling said piston to the other of said parts, said piston being movable in said cylinder in substantially the same direction as the vibratory movement of said translating device relative to said carriage, and said coupling means including a member which is stiff in said direction but flexible in a direction transverse thereto.

6. In phonographic apparatus, the combination of a carriage constituting a first part, a signal translating device pivotally mounted on said carriage and constituting a second part, said translating device being subject to slight mechanical vibrations relative to said carriage when cooperating with a record, and vibration inhibiting means for said translating device, said means comprising an air dash-pot including a cylinder carried by one of said parts, a piston within said cylinder movable therein in substantially the same direction as the vibratory movement of said translating device relative to said carriage, a piston rod secured to said piston, and a member coupling the other of said parts to said piston rod, said coupling member comprising a relatively thin, elongated element which is stiff in a longitudinal direction but flexible in a lateral direction, and said coupling member being arranged to extend longitudinally in the direction of movement of said translating device and said piston.

7. In phonographic apparatus, the combination of a carriage, a signal translating device pivotally mounted on said carriage and subject to slight mechanical vibrations relative to said carriage when cooperating with a record, and vibration inhibiting means for said translating device, said means comprising an air dash-pot including a cylinder carried by said carriage, a piston within said cylinder movable therein in substantially the same direction as the vibratory movement of said translating device relative to said carriage, a piston rod secured to said piston, and a piece of thin music wire coupling said translating device to said piston rod, said wire being stiff longitudinally and being flexible in a direction transverse to its length, and being arranged to extend longitudinally in the direction of movement of said translating device and said piston.

8. The invention set forth in claim 5 characterized in that the longitudinal surface of said piston is formed on a curve.

9. The invention set forth in claim 5 characterized in that the longitudinal surface of said piston is crowned.

10. A vibration inhibitor comprising a hollow cylinder having a fluid therein, a piston movably received in said cylinder and adapted to be moved therein against said fluid to compress said fluid, and means affording relief to said fluid when compressed, said piston having a longitudinal surface formed on a curve whereby said piston is free to rock within said cylinder while in engagement with the wall thereof whereby binding of said piston is prevented.

11. A vibration inhibitor comprising a hollow cylinder adapted to be secured to one of two relatively movable parts, said cylinder having a fluid therein, a piston movably received in said cylinder and adapted to be moved therein against said fluid to compress said fluid, means affording relief to said fluid when compressed, and means coupling said piston to the other of said two parts, said piston having a longitudinal surface formed on a curve whereby said piston is free to rock within said cylinder while in engagement with the wall thereof whereby binding of said piston is prevented, and said coupling means including a member which is stiff in the direction of coupling but flexible in a lateral direction.

HENRY E. ROYS.